R. G. AMO.
DEVICE FOR PREVENTING LEAKAGE OF LUBRICANT FROM MOTOR VEHICLE AXLES.
APPLICATION FILED APR. 28, 1917.
1,252,984.
Patented Jan. 8, 1918.
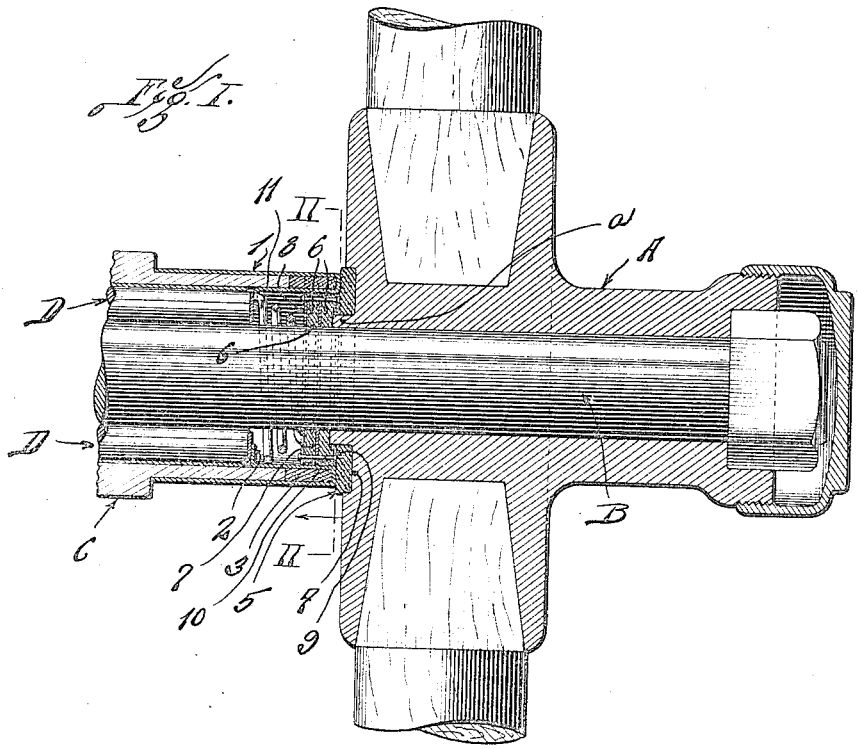
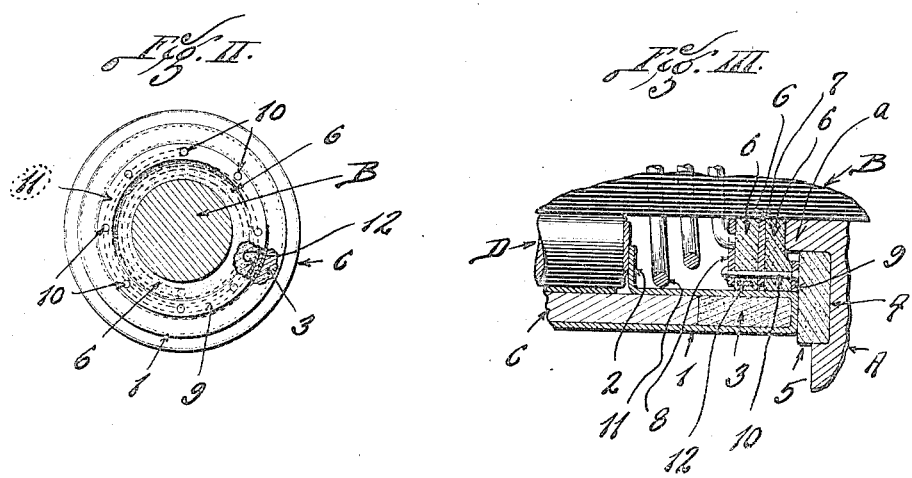

UNITED STATES PATENT OFFICE.

ROBERT G. AMO, OF ST. LOUIS, MISSOURI.

DEVICE FOR PREVENTING LEAKAGE OF LUBRICANT FROM MOTOR-VEHICLE AXLES.

1,252,984.     Specification of Letters Patent.     Patented Jan. 8, 1918.

Application filed April 28, 1917. Serial No. 165,165.

*To all whom it may concern:*

Be it known that I, ROBERT G. AMO, a citizen of the United States of America, a resident of the city of St. Louis, State of Missouri, have invented certain new and useful Improvements in Devices for Preventing Leakage of Lubricant from Motor-Vehicle Axles, of which the following is a full, clear, and exact description, reference being had to the accompanying drawing, forming a part of this specification.

My invention relates to a device for preventing the escape of lubricant from the casings of rear axles of motor vehicles, the invention having for its object to prevent the waste of lubricant from axles of the type mentioned, and also to obviate discharge of lubricant from the axles onto the vehicle wheels and the tires carried thereby.

Figure I is a longitudinal section through a portion of a semi-floating axle and the hub of a vehicle wheel fitted to the shaft of such axle, and showing my device associated with these parts.

Fig. II is a cross section taken on line II—II, Fig. I.

Fig. III is an enlarged fragmentary section of the parts as seen in Fig. I.

In the accompanying drawings, A designates the hub of a vehicle wheel, B the shaft of an axle mounted in said hub, and C the axle casing. The axle I have shown comprising the parts B and C is of the type known as semi-floating, the casing C being disposed around the shaft B and being separated therefrom by an anti-friction bearing comprising members D, usually in the form of rollers. The parts A, B, C and D combined with each other are common to several makes of motor vehicles and no invention *per se* is herein claimed for them.

1 designates a dust ring U-shaped in cross section fitted to an end of the axle casing C. This ring lies partially at the exterior of the end portion of the axle casing to which it is fitted, and partly interiorly thereof, the inner portion of the ring being provided with an inturned flange 2, most clearly seen in Fig. III, which lies in proximity to the outer end of the anti-friction bearing in said casing. Within the dust ring 1 is a cushion 3 of felt or other yieldable material, said cushion ring being designed to press the dust ring longitudinally of the vehicle axle and toward the inner face of the wheel hub A.

An annular pocket 4 is formed in the inner face of the hub A adjacent to the outer end of the dust ring 1, and in this pocket is arranged a yieldable packing ring 5 of felt or other suitable material (see Figs. I and III). The pocket 4 and the packing ring 5 therein are of sufficient width to extend beyond the inner wall of the dust ring 1 toward the axis of the wheel hub A.

G designates an annular guard situated within the dust cap 1. This guard is composed of a plurality of annular yieldable elements 6, of such size that they will fit snugly between the axle shaft B and the axle casing C, said members 6 being separated by a parting ring 7 and being held between two clamping rings 8 and 9 connected by rivets or pins 10. The rings 7 and 8 are slightly smaller in diameter than the yieldable members 6 of the guard G, and the yieldable elements 6 are therefore permitted to bear against the inner wall of the dust cap 1 without a similar action on the part of the rings 7 and 8. Consequently the yieldable elements 6 may constantly be so held against the dust ring as to prevent passage of lubricant to the hub of the vehicle wheel from the space between the guard G and the anti-friction bearing to which lubricant is supplied.

11 designates a coil spring located between the anti-friction bearing in the axle casing C and the guard G. This spring is preferably of frusto-conical form in order that its coils may nest within each other if the space between the anti-friction bearing and the axle casing and the hub wheel A is of such length as to require such nesting and the ends of the spring are preferably secured, respectively, one to the flange 2 of the dust ring 1 and the other to the ring 8 of the annular guard G.

One or both of the yieldable elements 6 has embedded therein an expansion ring 12, which is located near the periphery of said element 6 in which it is disposed and which serves to press the peripheral portion of the element 6 toward the inner wall of the dust ring 1, thereby enhancing the oil-proof fit between the yieldable elements of the guard G and the dust ring.

In the practical use of my device the spring 11 tends constantly to press the guard G outwardly and against an annular rib *a* the inner end of the hub A immediately adjacent to the axle shaft, and inasmuch as the yieldable elements of this guard are closely fitted to the inner wall of the dust ring 1, resultant leak-proof joints at two separate locations are produced, one at a right angle relative to the other. A third leakproof joint is also produced between the dust ring and the packing ring 5.

It will be noted that the dust ring 1 constitutes an extension of the axle casing B, and is, therefore, virtually a part of the casing.

While I have herein shown and described my device for preventing the escape of lubricant from the casing of a rear axle as comprising an annular lubricant guard held in contact with a wheel hub on the axle shaft, it will be understood that the wheel hub is in the nature of an abutment to which the annular lubricant guard is presented, and that an abutment may be provided on the axle shaft independently of the wheel hub to serve the same function as that served by the wheel hub. I therefore do not limit myself to the precise construction shown and described, but claim my invention in combination with an axle comprising an axle shaft, a casing surrounding said shaft, and an abutment of any desired form on the axle shaft to which the annular lubricant guard, slidable in contact with the shaft and casing, may be spring pressed.

I claim:—

1. The combination with an axle casing, an axle shaft within said casing, and an annular abutment on said axle shaft, of an annular lubricant guard slidable in contact with said shaft and casing, and a spring holding said guard against said abutment.

2. The combination with an axle casing, an axle shaft within said casing, and an annular abutment on said shaft, of a spring pressed annular lubricant guard between said casing and shaft, said guard comprising a yieldable element contacting with the inner surface of said casing and the periphery of said shaft.

3. The combination with an axle casing, an axle shaft within said casing, and an annular abutment on said shaft, of a spring pressed annular lubricant guard between said casing and said shaft, said guard comprising a yieldable element contacting with the inner face of said casing and the periphery of said shaft, and clamping rings between which said yieldable element is held.

4. The combination with an axle casing, an axle shaft within said casing, and an annular abutment on said shaft, of a yieldable packing ring seated in said abutment adapted to contact with an end of said casing, and a spring pressed annular lubricant guard within said casing arranged in contact with said packing ring.

5. The combination with an axle casing, an axle shaft within said casing, an annular abutment on said shaft, of a dust ring fitted to an end of said casing, an annular lubricant guard between said dust ring and said shaft, and a spring serving to hold said lubricant guard in contact with said abutment.

6. The combination with an axle casing, an axle shaft within said casing, and an annular abutment on said shaft, of a dust ring U-shape in cross section fitted to the end of said casing, an annular lubricant guard slidably fitted to the inner wall of said dust ring, and to the periphery of said shaft, and a spring serving to press said lubricant guard toward said abutment.

7. The combination with an axle casing, an axle shaft within said casing, and an annular abutment on said shaft, of a dust ring U-shape in cross section fitted to the end of said casing, a cushion ring within said dust ring between its outer end and the end of the casing, a packing ring in said abutment against which the outer end of said dust ring bears, an annular lubricant guard surrounding said shaft and contacting with the inner wall of said dust ring, and a spring serving to hold said lubricant guard in contact with said packing ring.

In testimony that I claim the foregoing I hereunto affix my signature.

ROBERT G. AMO.

Copies of this patent may be obtained for five cents each, by addressing the "Commissioner of Patents, Washington, D. C."